United States Patent [11] 3,617,344

[72] Inventors Robert I. Leininger;
 Richard D. Falb, both of Columbus, Ohio
[21] Appl. No. 570,411
[22] Filed Aug. 5, 1966
[45] Patented Nov. 2, 1971
[73] Assignee The United States of America as represented by the Secretary of the Department of Health Education and Welfare

[54] NONTHROMBOGENIC PLASTIC SURFACES AND PREPARATION THEREOF
16 Claims, No Drawings

[52] U.S. Cl.................................................... 117/47,
 117/93.1, 117/118, 117/138.8, 117/139, 424/183, 3/1
[51] Int. Cl..................................................... A61k 17/18, B44d 5/12
[50] Field of Search........................................... 117/62.1, 138.8 B, 138.8 C, 138.8 D, 138.8 E, 138.8 F, 138.8 U, 138.8 UF, 47, 118, 93.1; 128/DIG. 22; 3/DIG. 3; 167/74; 424/28, 183

[56] References Cited
OTHER REFERENCES

Scott, J. E., " The Reaction of Long-Chain Quaternary Ammonium Salts with Acidic Polysaccharides," Chemistry and Industry, No. 7, Feb. 12, 1955, pp. 168– 169, TP 1 S 63.

Gott et al., " Techniques of Applying a Graphite-Benzalkonium-Heparin Coating to Various Plastics and Metals," Transactions American Society for Artificial Internal Organs, Vol. X, June 25, 1964, p.p. 213– 217

Falb et al. " Development of Blood-Compatible Polymeric Materials," 29 June 1965, Battelle Memorial Inst., pp. 1– 19 Published 3 March 1966

Primary Examiner—William D. Martin
Assistant Examiner—David Cohen
Attorney—J. Y. Houghton ABSTRACT: A plastic polymer surface rendered substantially nonthrombogenic by heparin chemically combined with quaternary ammonium groups which are chemically bonded to the plastic polymer surface, which is preferably flexible or elastomeric; also several methods of producing same.

NONTHROMBOGENIC PLASTIC SURFACES AND PREPARATION THEREOF

This invention relates to nonthrombogenic plastic polymer surfaces and the preparation thereof and aims generally to improve the same.

It is known to physically apply a nonthrombogenic coating to a rigid plastic surface by coating the rigid surface with graphite and then treating the graphite with first zephiran and then heparin. This system, described by Dr. Vincent Gott, inter alia, is not applicable to either flexible or elastomeric materials, the use of which is desirable in connection with artificial lung machines and for other purposes involving circulation of blood in contact with the plastic surface. For these reasons the graphite system has limited utility.

An important object of the present invention is to provide a system of rendering a plastic surface nonthrombogenic which is applicable to flexible or elastomeric plastics as well as to rigid plastics.

A further object is to provide a polymer surface rendered substantially nonthrombogenic by heparin chemically bonded to the polymer surface.

Other objects and advantages of the invention will be apparent from the following description and examples of preferred embodiments and species thereof.

The invention resides in the new and useful combinations herein disclosed and is more particularly pointed out in the appended claims.

In its general aspects the invention provides a plastic polymer surface rendered substantially nonthrombogenic by heparin chemically combined with quaternary ammonium groups which are chemically bonded to the plastic polymer surface. The plastic polymer may be a rigid polymer such as polystyrene, but preferably is a flexible plastic or elastomeric polymer, since the latter are especially useful in apparatus and equipment to be used in contact with blood. In accordance with the invention, the plastic polymer surface is rendered substantially nonthrombogenic by a process which comprises two steps: (a) providing the said surface with quaternary ammonium groups chemically bonded to the polymer, and (b) heparinizing the said quaternary ammonium groups.

The polymer surface may be provided with quaternary ammonium groups, step (a), in any suitable way, preferably by chemical treatment after formation of the polymer surface. For example:

In a first embodiment of step (a) the polymer is provided with chloromethyl groups on its surface which are aminated with a tertiary amine to form the quaternary ammonium groups chemically bonded to the surface of the polymer.

In a first preferred species of this embodiment, the polymer provided with chloromethyl groups on its surface is formed by surface chloromethylation of a polymer having a reactive hydrogen on an aromatic ring, e.g. polystyrene, styrene-butadiene polymer, a polyphenylene oxide, or the like, and the resulting chloromethylated surface is aminated immediately without drying with a tertiary amine, e.g. triethyl amine, dimethyl aniline, or pyridine.

In a variation of this first preferred embodiment, the surfacing with chloromethyl groups is applied to polystyrene grafted to another polymer. Particular species of this embodiment may employ polyethylene, polypropylene, ethylene-propylene rubber, silicone rubber, or tetrafluoro-ethylene polymer, radiation grafted with polystyrene as the polymer to be chloromethylated, and then aminated with the tertiary amine.

In a second species of this first preferred embodiment, the surfacing with chloromethyl groups is applied to a polymer having surface hydroxyl groups by reaction with chloroacetic anhydride and is followed with amination by the tertiary amine.

In other species of this first preferred embodiment a polymer such as a polyolefin or a silicone rubber containing methyl groups may be subjected to surface chlorination to form the surface-chloromethylated polymer which may then be treated with tertiary amine, etc.

In a second embodiment of step (a) the polymer is provided with tertiary amine groups on its surface, which are quaternized by reaction with a quaternizing reagent, e.g. methyl iodide or benzyl chloride, to form the quaternary ammonium groups chemically bonded to the surface of the polymer.

In a first preferred species of this embodiment the polymer provided with tertiary amine groups on its surface is formed by radiation grafting of a tertiary amine, e.g. 2-vinylpyridine or 4-vinylpyridine, or the like, to the surface of the polymer to be heparinized, e.g. polystyrene, polyethylene, silicone rubber, tetrafluoroethylene polymer, a natural rubber, a synthetic elastomer, or other radiation graftable polymer, and the tertiary amine groups thus chemically bonded to the surface of the polymer are quaternized with the quaternizing agent.

In other species of this embodiment, an ester containing polymer such as an acrylic polymer, a polyester, a polyester-polyurethane or a maleic anhydride/methyl vinyl ether copolymer may be subjected to surface hydrolysis to convert surface ester groups to carboxyl groups which may then be converted to surface tertiary amine groups through the Curtius reaction and quaternized with the quaternizing agent.

The heparinizing, step (b), may be practiced in any suitable way and is very readily practiced simply by immersing the plastic polymer surface having quaternary ammonium groups chemically bonded thereto in alcoholic sodium heparinate, followed by removal from the surface of loosely bound heparin which has not complexed with the chemically bound ammonium groups, as by numerous distilled water rinses.

The quaternization and the heparinization are readily followed by measurement of zeta potential of the treated surface in contact with lactated Ringer's solution. In general, most plastics have a negative zeta potential while the quaternized surfaces give a positive zeta potential. The formation of the heparinized surfaces changes the zeta potential to the negative side and the permanence of the heparinization can be followed by changes of zeta potential as the surface is aged in contact with Ringer's solution.

Plastic articles of the invention, as compared to the thrombogenic nonheparinized polymers, are substantially nonthrombogenic; recalcified human blood in contact with the heparinized surfaces remaining unclotted for up to 20 hours or more, as against only a few minutes for the nonheparinized plastics.

The invention will be most readily understood from a consideration of the following specific examples, which, however, are to be considered as illustrative and not restrictive of the invention, the scope of which is more particularly pointed out in the appended claims.

EXAMPLES

EXAMPLE 1

A chloromethylation solution was prepared by dissolving 5 grams of aluminum chloride ($AlCl_3$) and 5 grams of chloromethyl ether ($ClCH_2OCH_3$) in 100 ml. of nitrobenzene ($C_6H_5NO$), and samples of polystyrene were immersed in such solution at 25° C. for 15 seconds. The resulting wet chloromethylated polystyrene samples were placed immediately in a 5 percent solution of dimethyl aniline ($C_6H_5N(CH_3)_2$) in methyl alcohol ($CH_3OH$) at 25° C. for 24 hours. After washing free of unreacted reagent by methanol, dilute aqueous hydrochloric acid, and distilled water rinses, in that sequence, the polystyrene samples having quaternary ammonium groups bonded thereto were immersed in dilute alcoholic sodium heparinate (1 percent by weight of sodium heparinate in 3/1 methanol/water at 25°C. for 1 hour.

The samples were repeatedly washed with distilled water until free of unreacted heparin. These samples were found to have been rendered substantially nonthrombogenic; recalcified human blood in contact therewith remained unclotted for over twenty hours, whereas the untreated polystyrene clotted it in 9 to 11 minutes.

The times, temperatures and concentrations of reactants employed in this example are noncritical and may be varied substantially, and in lieu of the dimethyl aniline other tertiary amines, especially pyridine, may be employed.

EXAMPLE 2

The procedure of example 1 was repeated, using samples of polycarbonate $[C_6H_5-O-COO]_n$ in lieu of the polystyrene samples. The chloromethylation was effected by immersion at 40° C. for 4 hours. The polymers after amination, quaternization, and heparinization of the surface groups also were substantially nonthrombogenic.

EXAMPLE 3

In this example the surfaces of immersible samples of polyethylene were radiation grafted with styrene by dipping in the styrene monomer while subjecting to gamma irradiation of $10^7$ rads, at 25° C., for 24 hours. The ungrafted styrene was removed by rinsing with ethyl acetate and the polyethylene samples surface grafted with polystyrene were then subjected to chloromethylation, quaternization and heparinization of the surfaces of the polystyrene grafts as in example 1, yielding a polyethylene having heparin chemically bonded to its surface, which was substantially nonthrombogenic.

Repetitions of this example employing polypropylene, ethylene-propylene rubber, silicone rubber, and tetrafluoroethylene polymer as the polymer surface grafted with styrene which was then chloromethylated, etc., also produced polymers having heparin chemically bonded to their surfaces and rendered substantially nonthrombogenic thereby. By limiting the amount of styrene surfaces grafted to the base polymer, the characteristics of the base polymer are substantially retained while rendering the surfaces thereof substantially nonthrombogenic.

EXAMPLE 4

Example 1 was repeated, employing samples of butadiene-styrene copolymer in lieu of the styrene samples. The chloromethylization was effected at 70°-80° C., and these samples also were rendered substantially nonthrombogenic.

EXAMPLE 5

Samples of polyvinyl alcohol were immersed in 5 percent chloroacetic anhydride in benzene and refluxed for 24 hours. The samples were removed and, while wet, immediately immersed in a 10 percent solution of pyridine in methanol and refluxed for 4 hours. After washing free of unreacted pyridine the quaternized samples were subjected to heparinization as in example 1, and were rendered substantially nonthrombogenic thereby.

EXAMPLE 6

Samples of polystyrene were radiation grafted with amine by immersion in a 5 percent solution of 4vinylpyridine in methanol for 24 hours, under gamma radiation of $10^7$ rads, and at 25° C. The samples were rinsed with a solvent for the amine (viz: ethyl acetate) to remove unreacted reagent. The samples then were immersed in a 10 percent solution of methyl iodide in methanol and subjected to reflux for 4 hours. The resulting quaternized material, after washing free of unreacted reagent was heparinized and washed free of unreacted heparin as in example 1. The resulting polymer was substantially nonthrombogenic.

Repetitions of this example, using polyethylene, silicone rubber and tetrafluoroethylene polymer as the polymer subjected to irradiation grafting with 4-vinylpyridine or 2-vinylpyridine to provide the surface with amine grafts for the quaternization with methyl iodide or benzyl chloride, followed by the heparinization steps, rendered these base polymers substantially nonthrombogenic.

While there have been described herein what are at present considered preferred embodiments of the invention, it will be clear to those skilled in the art that minor variations and changes may be made without departing from the essence of the invention. It is therefore to be understood that the exemplary embodiments are illustrative and not restrictive of the invention, the scope of which is defined in the appended claims, and that all modifications that come within the range of equivalency of the claims are intended to be included therein.

Partial disclosures of the present invention have been published, with the inventors' consent, within the last year preceding the filing of this application and such publications, which include but are not limited to Chemical and Engineering News, Vol. 44, No. 15, p. 37, Apr. 11, 1966, and Vol. 44, No. 16, p. 56, Apr. 18, 1966, are incorporated herein by reference and may be referred to for discussion of various aspects and advantages of the invention.

We claim:

1. A plastic polymer surface rendered substantially nonthrombogenic by heparin chemically combined with quaternary ammonium groups which are chemically bonded to the plastic polymer surface.

2. A plastic polymer surface as defined in claim 1, wherein the plastic polymer is a synthetic plastic material.

3. A plastic polymer surface as defined in claim 1, wherein the plastic polymer is a flexible polymer.

4. A plastic polymer surface as defined in claim 1, wherein the plastic polymer is an elastomeric polymer.

5. The process of rendering substantially nonthrombogenic a surface of a plastic polymer article, which comprises the steps of (a) providing said surface with quaternary ammonium groups chemically bonded to the polymer, and (b) heparinizing the quaternary ammonium groups.

6. A process as defined in claim 5 wherein step (b) is effected by immersing the plastic surface having quaternary ammonium groups chemically bonded thereto in alcoholic sodium heparinate followed by removal from the surface of loosely bound heparin which has not complexed with the chemically bonded ammonium groups.

7. A process as defined in claim 5 wherein in step (a) the polymer surface is provided with the quaternary ammonium groups by chemical treatment after formation of the polymer surface.

8. A process as defined in claim 7 wherein in step (a) the polymer surface is provided with the quaternary ammonium groups by (i) chloromethylation followed by (ii) amination with a tertiary amine.

9. A process as defined in claim 8 wherein the tertiary amine is from the group consisting of triethyl amine, dimethyl aniline, and pyridine.

10. A process as defined in claim 7 wherein in step (a) the polymer surface is provided with the quaternary ammonium groups by (i) providing the polymer surface with chloride groups followed by (i) amination with a tertiary amine.

11. A process as defined in claim 7 wherein in step (a) the polymer surface is provided with the quaternary ammonium groups by (i) providing the surface of the polymer with tertiary amine groups and (ii) quaternizing said tertiary amine groups with the aid of a quaternizing reagent.

12. A process as defined in claim 1, wherein the quaternizing reagent is selected from the group consisting of methyl iodide and benzyl chloride.

13. A process as defined in claim 11 wherein in step (a) (i) the polymer surface is provided with the tertiary amine groups by radiation grafting of a tertiary amine to the surface of the polymer.

14. A process as defined in claim 11, wherein the polymer being heparinized is a polymer having carboxyl groups chemically bonded to its surface, and wherein in step (a) (i) the carboxyl groups are converted to the tertiary amine groups by the Curtius reaction.

15. A process as defined in claim 11 wherein the polymer being heparinized is a polymer having ester groups chemically bonded to its surface, and wherein in step (a) (i) the ester groups are hydrolyzed to carboxyl groups which are converted to tertiary amine groups by the Curtius reaction.

16. A process as defined in claim 11, wherein the polymer is selected from the group consisting of polystyrene, polyethylene, tetrafluoroethylene polymer, natural rubber, synthetic elastomer, acrylic polymers, polyesters, polyester-polyurethanes, and maleic anhydride/methylvinylether copolymers.